Jan. 30, 1934.                E. E. WICKERSHAM                1,945,497
                                  HARVESTER
                          Filed July 29, 1930           4 Sheets-Sheet 1

INVENTOR
Elmer E. Wickersham
BY
White, Prost, Fehr & Lothrop
ATTORNEYS

Jan. 30, 1934.  E. E. WICKERSHAM  1,945,497
HARVESTER
Filed July 29, 1930    4 Sheets-Sheet 3

INVENTOR
Elmer E. Wickersham
BY
White, Prost, Flehr Lothrop
ATTORNEYS

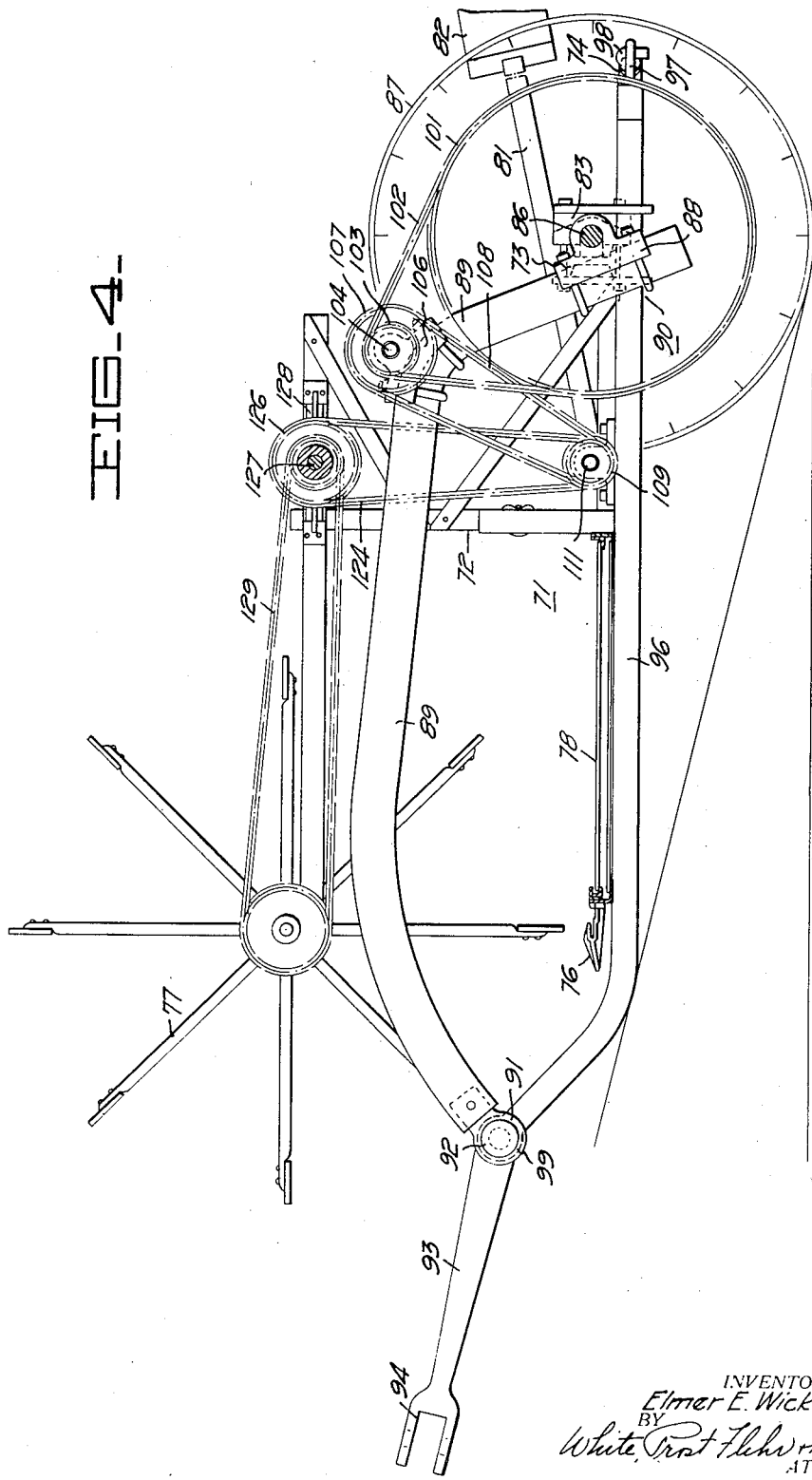

Patented Jan. 30, 1934

1,945,497

UNITED STATES PATENT OFFICE 1,945,497

HARVESTER

Elmer E. Wickersham, San Leandro, Calif., assignor to Caterpillar Tractor Co., San Leandro, Calif., a corporation of California Application July 29, 1930. Serial No. 471,544

18 Claims. (Cl. 56—23)

My invention relates to harvesting machinery and is especially concerned with mechanism for cutting standing grain and depositing the cut grain on the ground in windrows. Machines of this general character are disclosed in my copending application entitled Windrow header, Serial Number 272,435, filed April 24, 1928, now Patent No. 1,902,430, dated March 21, 1933. In mechanisms of this character there is provided a means for utilizing a standard header unit removed from a standard combined harvester. When forming part of the combined harvester the header unit is employed to cut standing grain. When detached however, the header unit by itself is useless. There is therefore generally provided a carriage for taking the place of the separator unit of the combined harvester and for rendering the detached standard header portable over the field. Heretofore it has been customary to utilize the standard header with the same relative location of parts and in the same manner in which it is used in a combined harvester. The usual header includes a draper having a generally horizontal portion disposed to the rear of the sickle and terminates in a spout portion, which is an extension of the draper, materially inclined to the horizontal so that the cut grain conveyed by the draper is advanced upwardly on an incline. In previous windrow adapters the draper is utilized in precisely this way with the inclined or spout portion of the draper extending over the carriage or framework of the windrow adapter. Since in previous practice the discharge portion of the draper is necessarily inclined in order to clear the adapter framework, such an arrangement is disadvantageous under numerous conditions inasmuch as the discharged grain is dropped from a considerable height above the field and may become embedded in the stubble or scattered if an appreciable wind is blowing.

It is an object of my invention to provide a windrow adapter in which the entire draper is disposed in a substantially horizontal position.

Another object of my invention is to provide a windrow adapter in which the framework is relatively simple but of ample strength to withstand the severe strains to which the mechanism is subjected in practice.

The foregoing and other objects are attained in the embodiment of the invention shown in the drawings, in which Figure 1 is a plan of a windrow adapter constructed in accordance with my invention, a portion of the header being broken away to reduce the size of the figure.

Figure 4 is a cross section on the line 4—4 of Figure 3.

In its preferred form, the windrow adapter of my invention comprises a header, having a draper projecting therefrom, joined to a framework including a tube arched to clear the draper and supported at one end on a ground engaging member and provided at the other end with a draft member.

Figure 1:
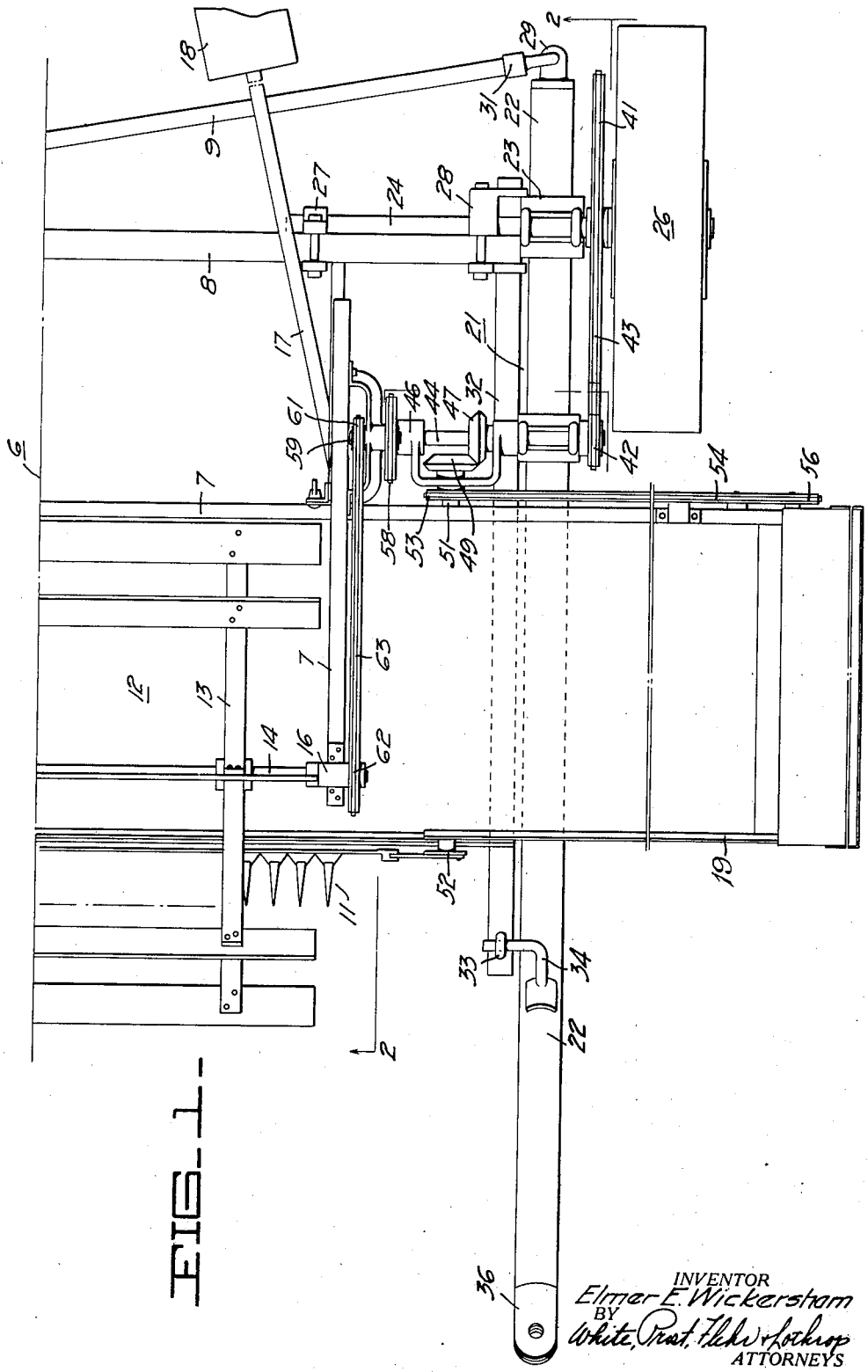
Figure 2:
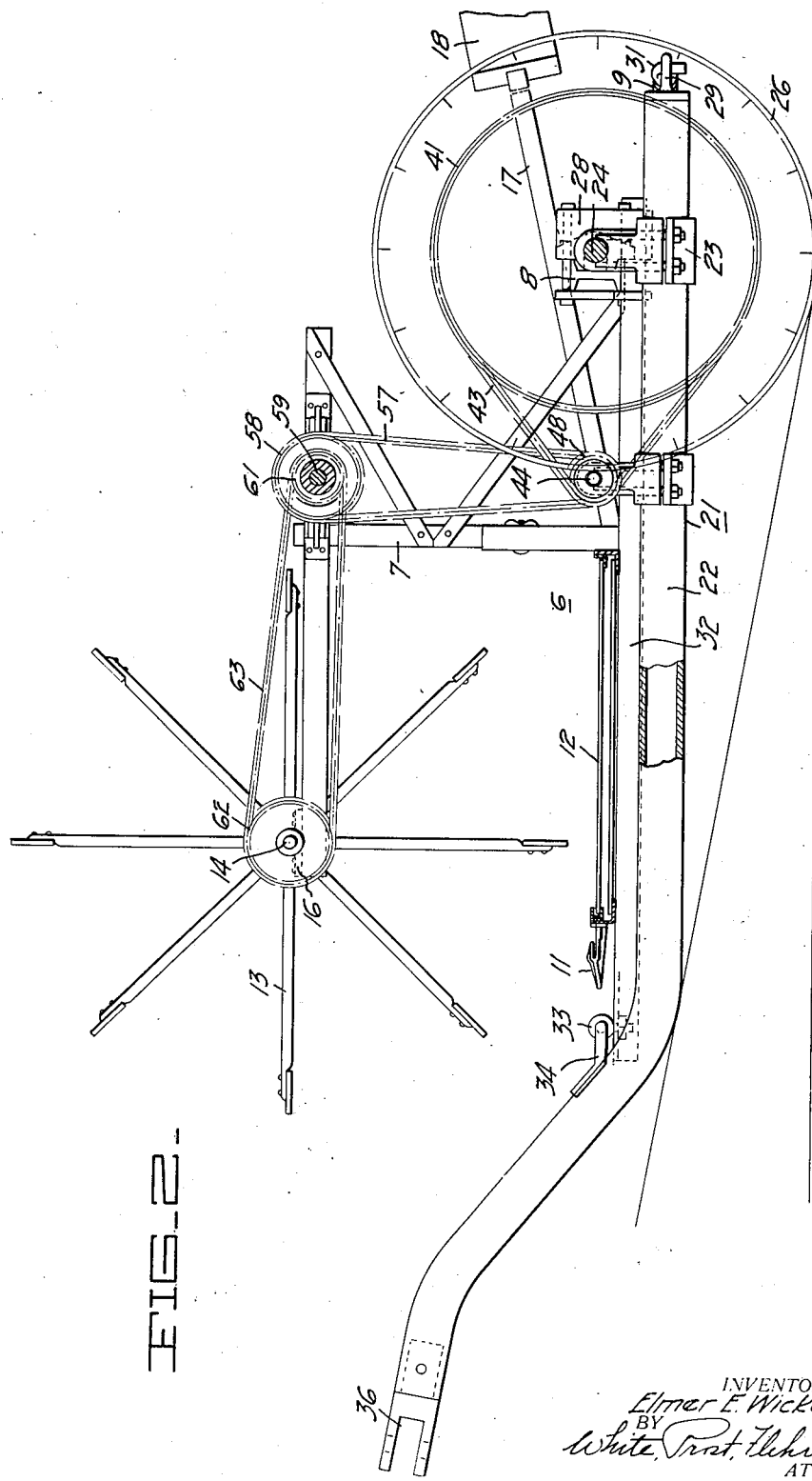
Figure 2 is a cross section on the line 2—2 of Fig. 1.

In the form of my invention which I have disclosed in Figures 1 and 2 there is provided a standard header, generally designated 6, having a framework 7 including an axle 8 and a push pole 9. On the header is mounted a sickle 11 adapted to cut standing grain as the header is advanced and to deposit the cut grain on a conveyor means such as draper 12. To assist the transfer of grain from the sickle to the draper there is provided a reel 13 mounted on a shaft 14 journalled, as at 16, on the framework 7. Also forming part of the standard header is a balance beam 17 to which a weight 18 is attached so that the structure is substantially balanced on the axle 8.

To prevent grain from being jarred off the draper when it is angularly positioned relative to the ground, as appears in Fig. 2, I include a member 19 to form a closure for a portion of the draper, as appears in Fig. 1.

In order that the draper 12 may extend in a substantially horizontal position and may lie relatively close to the ground I preferably provide for the standard header a windrow adapter including a framework generally designated 21. This framework comprises a tube 22, preferably of relatively large diameter, adjacent its rear end provided with a journal block 23 secured to the tube and affording means for mounting a stub axle 24. A ground engaging wheel 26 is carried on the axle 24 for supporting the framework 21. The stub axle 24 is secured to the axle 8 by clamps 27 and 28 so that the two axles 8 and 24 are substantially a continuous unit.

The rear end of the tube 22 is provided with an eye 29 into which a hook 31 on the push pole 9 fits with a relatively loose connection to assist in bracing the assembly. Also forming part of the framework 21 and acting as a further brace is a beam 32 at its rearward end connected to the clamp 28 and lying beneath the flat and substantially horizontally extending draper 12. The beam 32 is secured at suitable points throughout its length to the header framework 6 and at its forward end is provided with an eye 33 into which projects a support 34 secured to the forward end of the tube 22. Since the tube 22 is mounted in the journal block 23 and since the beam 32 is fastened to the axles 8 and 24 by the clamp 28, a limited rotary movement between the beam 32 and the tube 22 is possible. The support 34 can thus be made of any desired form to afford the requisite spacing between the beam 32 and the tube 22 so that the leading edge of the header or the sickle 11 can be disposed at any desired height from the ground. Although in windrow work a non-adjustable connection such as the member 34 is usually sufficient, I can provide an adjustment at this point if desired.

As shown particularly in Figure 2, the tube 22 passes below the horizontal draper and is arched between its rearward and forward ends to span or clear the draper. Preferably, the tube 22 is so arched intermediate its ends that it contacts with the ground and forms a support for the forward end of the mechanism, the draper or conveyor means being thus slightly inclined to the horizontal so that butt ends of stalks are lower than head ends on the draper and are thus laid on the stubble before the heads. If desired, the ground contacting portion of the tube can be suitably reinforced by a shoe or runner, not shown. The forward end of the tube 22 is preferably provided with a draft member 36 which is in the nature of a clevis adapted to be attached to the draw bar of a tractor or to any other suitable draft mechanism. It will be observed that the clevis 36 and the axle 24 are substantially at the same height from the ground and that the tube 22 is arched below the draper. The entire draper uniplanar and flat can thus be disposed in a substantially horizontal plane to discharge cut grain almost directly upon the ground. It will be further noted that by the provision of the tube 22 I afford a framework for the windrow adapter of great strength in proportion to its weight and a member which is easily fabricated into the desired shape.

The driving power for the various driven mechanisms on the header unit is derived from the wheel 26. A ring sprocket 41 rotated by the wheel 26 drives a sprocket 42 through a chain 43. The sprocket 42 is mounted on a shaft 44, journalled in a sub-frame 46, which also carries a bevel gear 47 and a sprocket 48. The gear 47 meshes with a bevel gear 49 on a shaft 51 extending forwardly to drive the crank plate 52 of the sickle 11. On the shaft 51 is a sprocket 53 engaging a chain 54 in turn engaging a sprocket 56 for driving the draper 12. The sprocket 48 is provided with a chain 57 engaging a reduction sprocket 58 on a stub shaft 59. Also mounted on shaft 59 is a sprocket 61 in alignment with a sprocket 62 connected to the reel 13. A chain 63 transmits motion from sprocket 61 to sprocket 62. By this arrangement, all the motion necessary for the moving parts of the header unit is derived from the rotation of wheel 26 as the mechanism advances.

Figure 3:
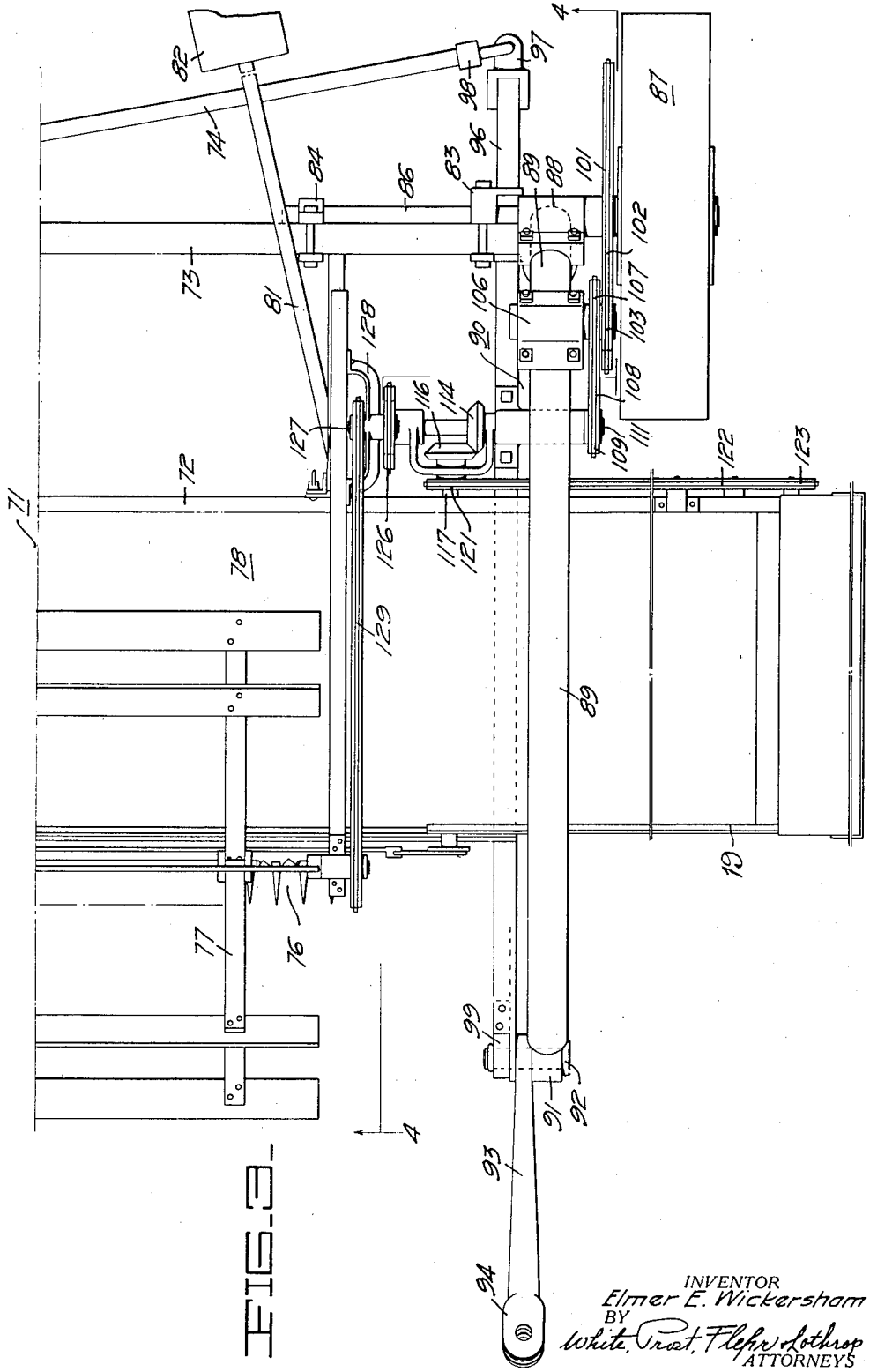
Figure 3 is a plan, similar to Figure 1, showing a modified form of windrow adapter in accordance with my invention.

In the modified form of my invention disclosed particularly in Figures 3 and 4 I likewise provide a standard header 71 such as forms part of a combined harvester. This header includes a framework 72 having an axle 73 and a push pole 74. At the forward end of the header there is provided the customary sickle 76 and a reel 77 for conveying grain cut by the sickle onto a draper 78 which is mounted on the framework 72 and is extended beyond the main frame so that the draper constitutes a uniplanar conveying means. The framework 72 is in addition provided with a balance beam 81 on which a weight 82 is situated so that substantially the entire mechanism is in balance about the axle 73.

The harvester also includes a member 79, corresponding to member 19 in Figs. 1 and 2, to prevent grain from falling off the slightly inclined but otherwise substantially horizontal draper.

In order to render the header unit 71 portable, I secure to the axle 73, by means of clamps 83 and 84, a stub axle 86 on which a ground engaging wheel or member 87 is journalled. Mounted on the axle 86 is a journal block 88 which serves as a clamp for one end of a tube 89 included in the framework, generally designated 90, of the windrow adapter. The tube 89 is of relatively large diameter and is arched intermediate its ends to clear the draper. At its forward end the tube 89 is provided with a journal 91 through which a pin 92 is passed to serve as a pivot for the draft member 93. A clevis 94 is formed on the draft member 93 for attachment to any suitable draft mechanism.

Also included in the framework 90 is a beam 96 attached at suitable points to the framework 72 of the header and at its rearward end carrying an eye 97 to engage with a hook 98 on the push pole 74. At its forward end, the beam 96 carries a journal 99 encompassing the pin 92 so that it is definitely related to the tube 89. If desired, however, the relationship between the beam 96 and the tube 89 can be adjustable so that the leading edge of the header, for instance the sickle 76, can be spaced as desired with respect to the ground.

In order to drive the various portions of the header unit which require power, I preferably utilize the ground engaging member 87 as a bull wheel to operate the driven mechanisms upon the advance of the windrow adapter. To this end, a bull gear 101 is mounted to rotate with the wheel 87. The bull gear 101 is encompassed by a chain 102 which also encompasses a sprocket 103. A shaft 104 mounted in a journal 106 secured to the tube 89 forms the support for the sprocket 103 and likewise supports a larger sprocket 107 about which a chain 108 is trained for transferring power from the sprocket 107 to a sprocket 109 fixed on a shaft 111.

A bevel gear 114 is mounted on the shaft 111 and meshes with a comparable gear 116 on a cross shaft 117 provided with a crank disc at its forward end for driving the sickle 76. A sprocket 121 also is mounted on the shaft 117 and by means of a chain 122 drives the draper 78 through a sprocket 123. A chain 124 is driven by a suitable sprocket on the shaft 111 and rotates a sprocket 126 mounted on a shaft 127 journalled in a bracket 128 on the framework 72. A sprocket chain 129 extends from the sprocket 126 to drive the reel 77. In this fashion the rotating parts of the header are driven during the advancing movement of the vehicle.

In this form of the invention as well as the form shown in Figs. 1 and 2, there is provided a framework which is light in comparison to its strength, which spans the extension of the draper in such a fashion that the draper can be operated in a substantially horizontal position in order to obtain the best results in windrowing. Furthermore, there is provided a simple and direct means for driving the various moving elements of the standard header and there is provided a suitable draft connection for the propulsion of the resulting vehicle over the field.

It is to be understood that I do not limit myself to the form of the windrow adapter shown and described herein, as the invention, as set forth in the following claims may be embodied in a plurality of forms.

I claim:

1. In a harvester, a header including a header frame and a draper disposed substantially in a single plane, said draper overhanging the header frame; a frame extending rearwardly and forwardly transversely across the overhanging portion of the draper; and means connecting said frames.

2. A windrow machine comprising a header unit including a header frame and a draper disposed substantially in a single plane, said draper overhanging the header frame; a frame extending rearwardly and forwardly transversely across the overhanging portion of the draper; a ground-engaging wheel on said latter frame; means connecting said frames; and means for driving elements on the header from the ground-engaging wheel.

3. A windrow machine comprising a header unit including a header frame, a draper disposed substantially in a single plane, and a shaft, said draper overhanging the header frame; a frame extending rearwardly and forwardly transversely across the overhanging portion of the draper, said latter frame having a shaft; and means connecting said shafts to connect said frames.

4. In a harvester, a header including a header frame and a draper disposed substantially in a single plane, said draper overhanging the header frame; a frame extending rearwardly and forwardly transversely across the overhanging portion of the draper, said latter frame being shaped to clear the draper; and means connecting said frames.

5. A windrow machine comprising a header unit including a header frame and a draper disposed substantially in a single plane, said draper overhanging the header frame; a frame extending rearwardly and forwardly transversely across the overhanging portion of the draper, said latter frame being arched to clear the draper; and means connecting said frames.

6. A windrow machine comprising a header unit including a header frame and a draper disposed substantially in a single plane, said draper overhanging the header frame; a frame extending rearwardly and forwardly transversely across the overhanging portion of the draper, said latter frame being shaped to clear said draper; a ground-engaging wheel on said latter frame; means for driving elements on the header from the wheel; and means connecting said frames.

7. In a harvester, a sickle, a draper disposed substantially in a single plane and extending beyond said sickle, and a frame extending transversely across the portion of the draper extending beyond the sickle, said frame being arched to clear said portion.

8. In a harvester, a sickle, a draper disposed substantially in a single plane and extending beyond said sickle, and a frame extending transversely across the portion of the draper extending beyond the sickle, said frame supporting said portion and being arched to clear said portion.

9. In a harvester, a header frame having a draper thereon; and a main supporting frame for said header frame, said main frame including a plurality of members movably connected, one of which members provides a support for the draper.

10. In a harvester, a header frame having a draper thereon; and a main supporting frame for said header frame, said main frame including a plurality of members pivotally connected together and extending transversely across the draper, one of which members provides a support for the draper.

11. A windrow machine comprising a header having a draper thereon; a main supporting frame for said header frame, said main frame including a plurality of members extending across the draper; a wheel supporting axle connected to said members and about the axis of which the members are relatively pivotal, one of which members provides a support for the draper, and means connecting said members at a position spaced from said axle.

12. In a harvester, a header unit including a header frame and a draper disposed substantially in a single plane, a main supporting frame for said header frame and extending transversely across the draper, said main frame including means whereby the angle of the draper with respect to the ground may be set; and means connecting said frames.

13. In a harvester, a header unit including a header frame and a draper; a main supporting frame for said header frame and extending transversely across the draper, said main frame including means whereby the angle of the draper with respect to the ground may be set; and means connecting said frames.

14. In a harvester, a header having a draper, and a supporting frame for the draper, said supporting frame having a portion shaped to contact the ground and hold the draper in an inclined position relative to the ground.

15. In a harvester, a header having a draper disposed substantially in a single plane; and a supporting frame for the draper having an arched portion adapted to clear the draper, contact the ground and hold the draper in an inclined position relative to the ground.

16. In a harvester, a sickle, a draper adapted to receive grain cut by said sickle, said draper being disposed substantially in a single plane, and a main frame extending transversely with respect to said draper at one end thereof for supporting said draper, said frame passing around said draper, adjacent said one end.

17. In a harvester, a draper having a cut grain receiving position, and adapted to discharge cut grain directly onto a field, said draper lying in substantially a single plane, and a main supporting framework therefor extending forwardly and rearwardly of said draper adjacent one end thereof.

18. In a harvester, a draper, and a supporting framework for said draper, said framework having a main frame extending beneath said horizontal draper and another portion, extending across said draper.

ELMER E. WICKERSHAM.